Feb. 6, 1945.  C. L. WILBER  2,368,695
METHOD OF MAKING AXLE SPINDLES
Filed Jan. 25, 1940  2 Sheets-Sheet 1
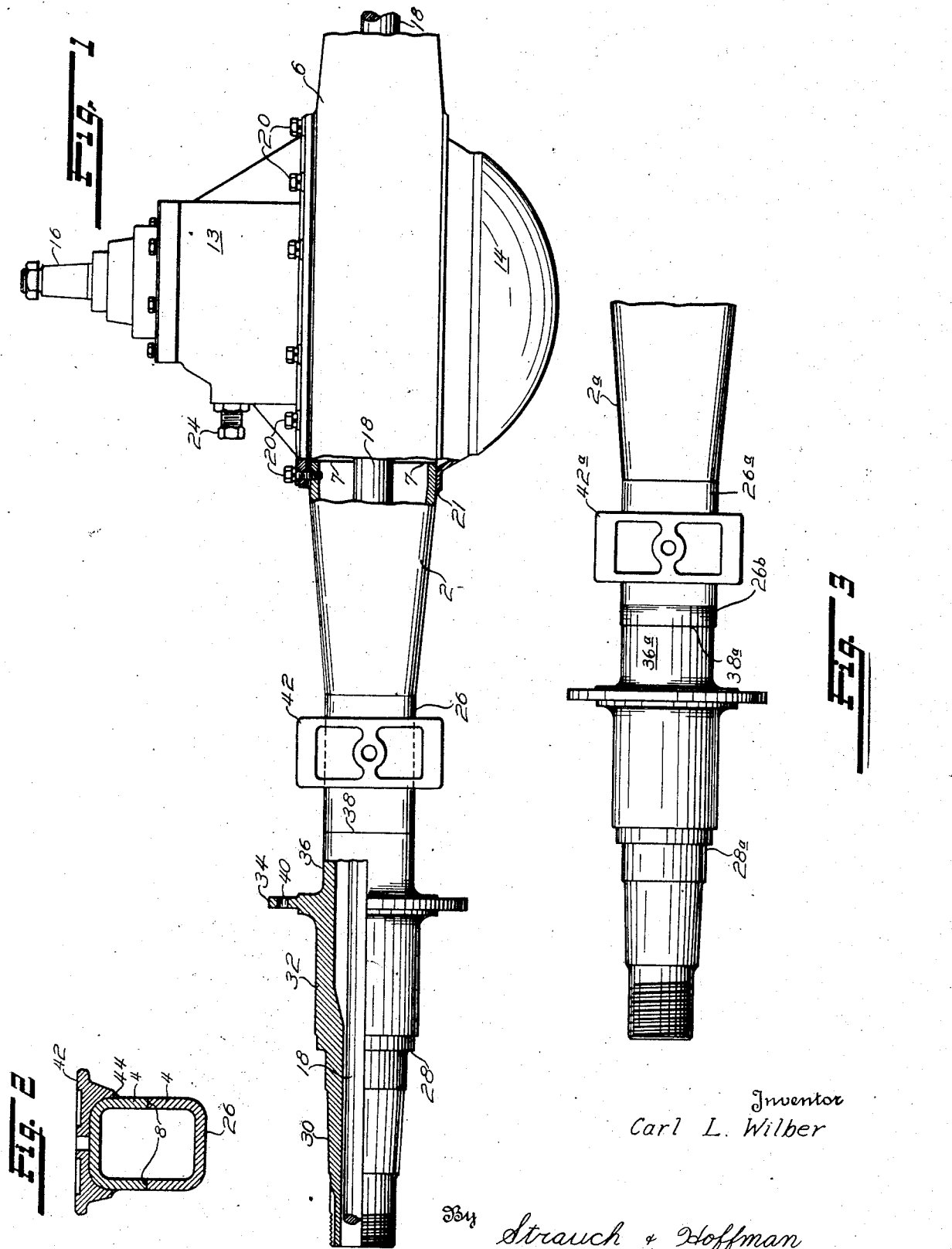
Inventor
Carl L. Wilber
By Strauch & Hoffman
Attorneys Feb. 6, 1945.        C. L. WILBER        2,368,695
METHOD OF MAKING AXLE SPINDLES
Filed Jan. 25, 1940        2 Sheets-Sheet 2
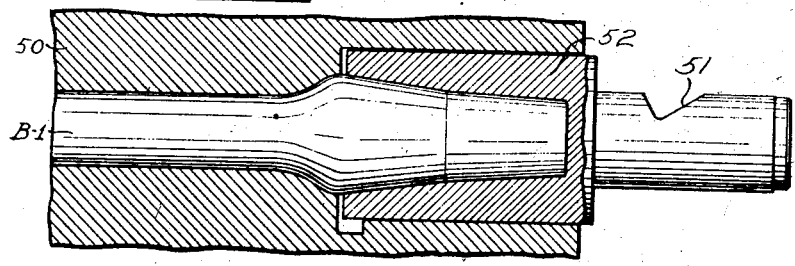
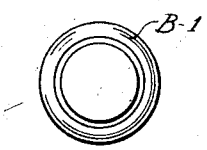
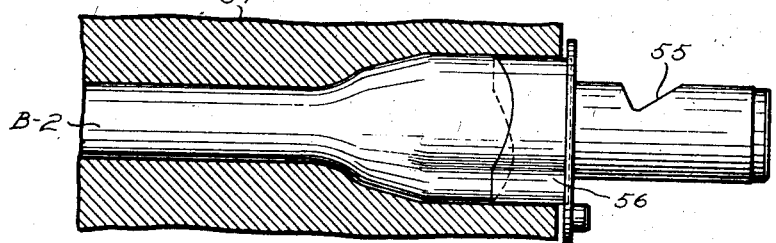
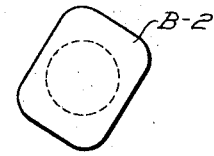
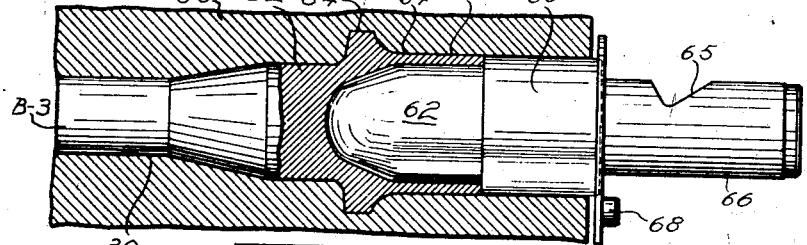
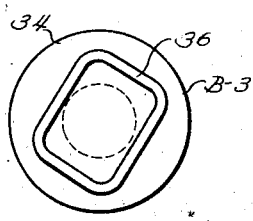
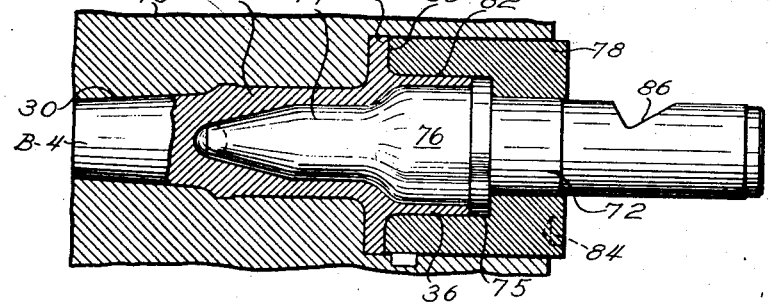
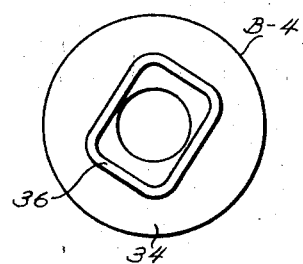
Inventor
Carl L. Wilber
By Strauch & Hoffman
Attorneys Patented Feb. 6, 1945

2,368,695

UNITED STATES PATENT OFFICE 2,368,695

METHOD OF MAKING AXLE SPINDLES

Carl L. Wilber, Detroit, Mich., assignor to The Timken-Detroit Axle Company, Detroit, Mich., a corporation of Ohio Original application December 29, 1936, Serial No. 118,166, now Patent No. 2,204,287, dated June 11, 1940. Divided and this application January 25, 1940, Serial No. 315,612

4 Claims. (Cl. 29—153.1)

This invention relates to methods of and apparatus for making certain parts of axle housings of the type used to support the rear wheels of an automotive vehicle and to house the usual differential mechanism and driving axles through which power is transmitted to the wheels.

This invention deals with methods of and apparatus for producing the novel axle spindle construction disclosed and claimed in my co-pending application Serial No. 118,166, filed December 29, 1936, for Axle housing, and this application constitutes a division of that application.

In the welding of abutting sections of generally tubular shape, it is requisite for proper welding that wall thickness of the abutting sections at the point of welding be uniform. In constructing the housing body of the axle assembly disclosed in my aforesaid co-pending application little difficulty is experienced. However, in the making of the spindle portions or the spider elements of that application, which are to be welded to the housing body, great care must be exercised to insure that the tubular extensions of the spindle portions are of uniform wall thickness. When the abutting sections are round a fair degree of accuracy and uniformity of wall thickness can be obtained with the usual forging operations. This is not the case, however, when the abutting tubular sections are of non-circular cross section.

It is therefore the major object of this invention to provide an improved method and apparatus for forging the spindle-forming portions of the axle housing whereby absolute uniformity of wall thickness throughout the entire extent of the tubular projections, carried by said portions, and exact matching with the corresponding portions of the housing body is insured, regardless of the shape of these portions.

A further object is to provide a novel punch and die apparatus, embodying means for accurately maintaining them in angular relationship as they undergo relative axial movement, which insures absolute uniformity of wall thickness throughout the forging operation to insure absolute uniformity of wall thickness in the resulting product.

Further objects will become apparent from the following specification and the accompanying drawings, and from the appended claims.

In the drawings:

Figure 1 is a top view of an axle housing embodying an axle spindle made in accordance with the invention, and with certain parts in section to show the interior construction thereof, and with one end broken away.

Figure 2 is a sectional view taken through the axle and spring seat of the construction shown in Figure 1.

Figure 3 is a top view of a portion of a modified form of axle housing assembly embodying a spindle constructed in accordance with the method and apparatus of this invention.

Figures 4–11 are schematic views showing several steps employed in my novel method of forging the spindle or brake spider element and also showing the novel apparatus used in the process; Figures 4, 6, 8 and 10 showing the actual forging steps, while Figures 5, 7, 9 and 11 are end views of the blank in its several stages of manufacture.

With continued reference to the drawings, wherein like reference characters are employed to designate the same elements wherever they occur, and with particular reference to Figures 1 and 2, which show the novel spindle and housing body which go to make up the novel axle assembly of my aforementioned copending application, the body section 2 carries axle shafts 18 and is made up of a pair of opposed channel-like members 4—4 which are bowed at their mid-sections to provide an enlargement or banjo 6 open at both front and rear. The banjo is closed at the rear by a cover 14. A gear mount 13, carrying a pinion shaft 16 and a bevel gear shoe adjusting screw 24, is secured to the banjo section by screws 26. The channel-like members are U-shaped and welded together along their meeting edges as disclosed in my aforementioned application.

The housing assembly is symmetrical about a transverse vertical plane to the center of the "banjo" section and the disclosure and description is therefore limited to one side thereof, it being understood that the other side is in all respects identical thereto.

End sections 28, which extend from each side of the banjo section, are of uniform section adjacent their outer ends, and as seen in Figure 2 are of generally rectangular shape. A spring seat 42 is secured to the outer end of each of the extended portions 28 by welding at 44. The wheel spindle or brake-spider element 28 consists of a wheel supporting section 30, a tubular portion 32, radially extending flange 34, and an axially directed tubular flange 36.

Flange 36 is rectangular in shape, and it is also of the same dimensions as the rectangular shaped end portion 28, so that the two exactly match when brought into abutting relationship. In Figure 1, these abutting edges are shown butt-welded together at 38.

When the structure is mounted in the vehicle bearing members (not shown) are secured to wheel portion 30, and a brake operating mechanism is secured to flange 34 by bolt and nut assemblies extending through holes 40.

In the fabrication of an axle housing assembly, the body section 2 is first formed by welding the two channel members 4—4 together. Next, the spindle or spider elements 28 are butt-welded to the ends of the portions 26—26 of the housing assembly, preferably by electric welding, and lastly the drive axles and differential mechanism and the cover member 14 are assembled. The spring clips 42 are preferably welded to the housing just prior to the welding of the spindle elements 28—28 to the body section.

The careful matching of the abutting sections of the spindle 28 and housing section 26, both as to shape and wall thickness, makes it possible to obtain a very strong weld at this point, thus doing away with extra metal at the joint.

In Figure 3, I have shown the spindle of slightly different shape secured to a housing 26a of somewhat modified form. In this construction, a body section 2a, which is composed of two channel members welded together in the same manner as section 2, has end portions 26a—26a which are of rectangular cross-section for substantially their entire extent. However, immediately adjacent the outer end of portion 26a, the rectangular section is necked down to a circular section 26b. The axially extending flange 36a of spindle element 28a is likewise of circular section, and exactly matches the end section of portion 26a. This exact matching is required for the obtaining of a good weld at point 38a, where the two elements are jointed by butt-welding in the same manner as elements 26 and 28 of the embodiment shown in Figures 1 and 2.

A feature very essential to the success of the axle resides in the forming of the rectangular axle tubular flange 36 in the end section of spindle 28 of exactly matching cross-sectional shape with that of the outer end section 26 of the housing 2. In order that the best weld possible may be obtained, it is necessary that the abutting sections of elements 26 and 36 not only match as to shape, but also that these tubular sections be of the same wall thickness and that the wall thickness be of uniform value around the entire periphery of the tubular section. This requirement results from the fact that an even heating of the metal is necessary to obtain a good weld, and since these sections are butt-welded any variation in the thickness of the metal will be reflected as uneven heating.

This condition is obtained without great difficulty in the housing member sections 26 by controlling the size and shape of the dies used in stamping the channel-like members 4—4. However, a real problem is presented in forming the tubular flange 36 of the spider or spindle element 28 to the desired shape and size, especially as the same is of rectangular shape as shown in Figures 1 and 2, and this invention provides a novel method and means to forge the spindle element and obtain this desired result.

Referring now to Figures 4 to 11, the method and apparatus for carrying it out are disclosed. The forging process is carried out in a series of steps illustrated in Figures 4, 6, 8 and 10 and is as follows: Starting with a piece of round bar stock the same is first upset to the cone-shape B—1, Figure 4, by means of the die 50 and the upsetting tool 52 operated by a means, not shown, keyed to the tool 52 and 51. It will be understood that in this step, as in those following, a suitable stop means is employed to prevent axial movement of the blank in the exterior die member. A forging machine that is conventional, except for novel punch and die elements hereafter described, is used throughout this entire process. Next, the blank is placed in die 54 and further upset or shaped to the form B—2, Figure 6, by the tool 56 operated by a means, not shown, keyed to the tool at 55. At this stage the enlarged end of the blank B—2 is rectangular in cross-section as shown by Figure 7, which is an end elevation of the blank looking towards the said enlarged end. After the first step the enlarged end is conical as will be seen from Figure 5 an end elevation of the blank B—1.

In the third step, a combined punching and shaping process is carried out by means of die 58 and punch 60. In this step, the flange 34 is partially formed and the tubular flange 36 initially shaped, also the tubular portion 32 and wheel bearing section 30 begin to take shape. Figure 8 shows this step while Figure 9 shows an end elevation of the blank B—3. It is very important at this stage of the process that the walls of the extension 36 be of uniform thickness throughout the entire periphery thereof. This result is obtained by exactly positioning the leading end 62 of the punch 60 in proper angular relationship with the die 58. The portion 64 of die 58 is rectangular in shape and the leading end 62 is of similar shape but slightly smaller in size to produce the tubular section 36. It is obvious that, if the punch 60 rotates, even a slight amount, with respect to die 58, a tubular section of uniform wall thickness will not be obtained. To obviate such rotation, the shank 66 of punch 60 is provided with a key or pin member 68 which is received in a recess in the punch operating means, not shown, but which is also keyed to the punch at keyway 65. The punch operating means is held against rotation with respect to the die 58; and, by suitably correlating the pin 68 with respect to the leading end 62 and the rectangular portion 64 of the die 58, the proper angular relationship between the leading end and the die is absolutely maintained and uniformity in the wall thickness of the tubular flange 36 results.

In the final step of my improved process, a combined extruding, shaping and punching process is carried out as illustrated in Figure 10; Figure 11 showing an end elevation of the finished blank B—4. A die 70 is shaped to give the proper exterior rough shape to the portions 30, 32 and a side and edge of the flange 34 of the spider element, while a punch 72 continues the punching process of the former step. Carried by the shank of punch 72 is a movable die or ring member 78. In operation the punch operating means, not shown, abuts the outer end of the die 78 and is provided with a pin snugly fitting in the recess 84. This operating means is also keyed to the shank 72 at the keyway 86. As the operating means cannot rotate with respect to the die 70, it will be seen that the punch 72, ring 78 and die 70 are all maintained in fixed angular relationship.

The portion 74 of the leading end of punch 72 is tapering and of circular section to form the tubular section 32, while the portion 76 is of rectangular shape and cooperates with portion 82 of the movable die 78, which is also of rectangular shape, to finish the tubular portion 36. The end 80 of movable die 78 finishes the front face of flange 34. In this last step, the linear extent of flange 36 is decreased while the radial extent of the flange 34 is increased and extruded between the die 70 and end 80 of die 78. A rib 75, on punch 72, determines the finished length of the flange 36. Since the rectangular portion 76 is held during these steps in proper angular relation to the portion 82 of die 78, absolute uniformity in the wall thickness of flange 35 is assured, even though the whole punch and die assembly 72—76 does move slightly with respect to die 70. The flange 36 is readily formed between the opposed surfaces 76 and 82. The real problem is to hold these surfaces in proper position, and this is simply done when accomplished as above described. The nature of this last step is such as to remove any inaccuracies of the preceding step where the punch 60 may possibly move out of exact alignment with the die 58, or possibly rotate slightly with respect thereto. An added advantage of the combined punch and die set up used in this last step resides in the fact that when the die 78 becomes worn it may be readily removed from the punch 72 and replaced by a new die.

If desired, the last step may be carried out in two stages, with two complete sets of die and combined punch and die similar to those shown in Figure 10, but of progressively varying sizes, to lessen the amount of metal working in each stage, thus decreasing the wear on the punches and dies.

By the foregoing novel forging process, utilizing in the last step my improved combined punch and movable die, it is possible to economically produce the spider element 28 with a minimum number of steps and with a final step which assures absolute uniformity of all thickness in the tubular flange which is to be joined to the housing section by butt-welding. It will be understood that portions of the blank B—4 are suitably machined to the finished shape, as shown in Figure 1, subsequent to the last forging step above described. However, no machining is required on the flange 36 which is finished to size in the last forging step.

It will also be evident that my improved process and apparatus, while especially adapted to the production of spindle elements wherein the end flange is of rectangular section causing great difficulty in the regulation of wall thickness thereof may be used in the production of spider elements of the type shown in Figure 3, and having end flanges 36a of circular section. In this event, the portions 62—64 of punch 60 and die 58, and the portions 76—82 of punch 72 and die 78, will of course be circular in section. By virtue of the novel punch and movable die used in the last step of my improved process, absolute uniformity will likewise be obtained in the tubular flange portion. Although a slight rotation of the punch with respect to the die, in the third or last steps, will not be as serious in the case of a circular flange, it will produce inaccuracies in wall thickness and the same will also be produced by misalignment of punch and die. These are all removed by the final step of my process as above explained. Hence, it is seen that my improved process and punch and die assembly have great utility in the formation of end flanges of any desired shape where uniformity of wall thickness is essential.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of forging a wheel spindle element comprising a radial flange and an axial tubular flange adjacent to said first named flange, including the following steps, upsetting a cylindrical billet in a direction parallel to its axis to form an enlarged end portion, pressing said enlarged end portion to a cross-sectional shape corresponding to the external shape of said axial flange, punching a similarly shaped recess in said enlarged portion to preform said axial flange and extruding a ridge of metal thereon for said radial flange, and finally further extruding said ridge of metal between relatively movable punch and die elements to finish-form said radial flange while at the same time pressing said preformed axial flange to finished shape between the relatively fixed opposed surfaces of a combined punch and die elements.

2. The method of forging a wheel spindle element comprising a radial flange and an axial tubular flange adjacent said first-named flange, comprising the following steps, upsetting a cylindrical billet in a direction parallel to its axis to form an enlarged end portion; pressing said enlarged end portion to a cross-sectional shape corresponding to the external shape of said tubular flange; punching a similarly shaped recess in said enlarged portion to preform the interior of said tubular flange and simultaneously extruding a ridge of metal thereon for said radial flange; and finally further extruding said ridge of metal to materially increase the diameter thereof and finish-form said radial flange, while at the same time axially pressing said preformed tubular flange to materially decrease its axial length and bring it to finish shape and to form an accurately shaped radial end face thereon.

3. A method of forming an elongated wheel spindle having a radial flange intermediate its ends and an axially extending tubular flange of non-circular cross-section merging into said radial flange, the internal and external walls of said tubular flange being of exactly similar shape and disposed parallel to each other, including the following steps: upsetting one end of an elongated billet to form an enlarged solid end thereon of non-circular cross-sectional shape corresponding to the desired external shape of said tubular flange; die pressing said billet to gather a ridge of metal for said radial flange and simultaneously punching the enlarged end to hollow out said tubular flange and rough-form the internal and external walls thereof while so controlling the flow of metal as to form said walls exactly parallel to each other throughout their length; and finally applying axially directed forces to said blank to bring said radial flange to finish shape while simultaneously bringing the external and internal walls of said tubular flange to finish shape while exerting transverse confining forces upon said internal and external walls and so controlling the flow of metal as to maintain them in absolute parallelism.

4. The method defined in claim 3, wherein said final step also comprises materially decreasing the axial length of said tubular flange while exerting transverse confining forces upon both the external and internal walls thereof and maintaining them in absolute parallelism.

CARL L. WILBER.

CERTIFICATE OF CORRECTION.

Patent No. 2,368,695.  February 6, 1945.

CARL L. WILBER.

It is hereby certified that error appears in the printed specification of the above numbered patent requiring correction as follows: Page 3, second column, line 16, claim 1, before "extruding" insert --simultaneously--; and that the said Letters Patent should be read with this correction therein that the same may conform to the record of the case in the Patent Office.

Signed and sealed this 12th day of June, A. D. 1945.

Leslie Frazer (Seal)  Acting Commissioner of Patents.